US008073698B2

(12) United States Patent
Ativanichayaphong et al.

(10) Patent No.: US 8,073,698 B2
(45) Date of Patent: *Dec. 6, 2011

(54) ENABLING GLOBAL GRAMMARS FOR A PARTICULAR MULTIMODAL APPLICATION

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,149

(22) Filed: Aug. 31, 2010

(65) Prior Publication Data

US 2010/0324889 A1 Dec. 23, 2010

Related U.S. Application Data

(63) Continuation of application No. 11/679,279, filed on Feb. 27, 2007, now Pat. No. 7,809,575.

(51) Int. Cl.
*G10L 21/00* (2006.01)
*G10L 11/00* (2006.01)
*G10L 15/18* (2006.01)

(52) U.S. Cl. ......................... 704/270; 704/257; 704/275

(58) Field of Classification Search ........................ None
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,606,599 B2 | 8/2003 | Grant et al. | |
| 6,856,960 B1 | 2/2005 | Dragosh et al. | |
| 6,920,425 B1 | 7/2005 | Will et al. | |

(Continued)

FOREIGN PATENT DOCUMENTS

CN 1385783 12/2002

(Continued)

OTHER PUBLICATIONS

U.S. Appl. No. 10/441,839, Ativanichayaphong, May 20, 2003.

(Continued)

*Primary Examiner* — Brian Albertalli
(74) *Attorney, Agent, or Firm* — Wolf, Greenfield & Sacks, P.C.

(57) ABSTRACT

Methods, apparatus, and computer program products are described for enabling global grammars for a particular multimodal application according to the present invention by loading a multimodal web page; determining whether the loaded multimodal web page is one of a plurality of multimodal web pages of the particular multimodal application. If the loaded multimodal web page is one of the plurality of multimodal web pages of the particular multimodal application, enabling global grammars typically includes loading any currently unloaded global grammars of the particular multimodal application identified in the multimodal web page and maintaining any previously loaded global grammars. If the loaded multimodal web page is not one of the plurality of multimodal web pages of the particular multimodal application, enabling global grammars typically includes unloading any currently loaded global grammars.

20 Claims, 7 Drawing Sheets

U.S. PATENT DOCUMENTS

| | | |
|---|---|---|
| 6,999,930 B1 | 2/2006 | Roberts et al. |
| 7,035,805 B1 | 4/2006 | Miller |
| 7,171,243 B2 | 1/2007 | Watanabe et al. |
| 7,188,067 B2 | 3/2007 | Grant et al. |
| 7,203,645 B2* | 4/2007 | Pokhariyal et al. .......... 704/251 |
| 7,206,742 B2* | 4/2007 | Schmid et al. ................ 704/257 |
| 7,210,098 B2* | 4/2007 | Sibal et al. .................... 715/205 |
| 7,330,890 B1 | 2/2008 | Partovi et al. |
| 7,376,586 B1 | 5/2008 | Partovi et al. |
| 7,395,206 B1* | 7/2008 | Irwin et al. .................... 704/270 |
| 7,487,085 B2 | 2/2009 | Ativanichayaphong et al. |
| 7,509,659 B2 | 3/2009 | McArdle |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Sienel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0138890 A1 | 7/2004 | Ferrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kujirai |
| 2005/0075884 A1 | 4/2005 | Badt |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/0188412 A1 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger et al. |
| 2005/0283367 A1 | 12/2005 | Cross |
| 2006/0047510 A1 | 3/2006 | Cross |
| 2006/0064302 A1 | 3/2006 | Cross |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0233488 A1* | 10/2007 | Carus et al. .................... 704/257 |
| 2007/0265851 A1 | 11/2007 | Ben-David et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross et al. |
| 2008/0059195 A1* | 3/2008 | Brown .......................... 704/270 |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Ativanichayaphong et al. |
| 2008/0162136 A1 | 7/2008 | Agapi et al. |
| 2008/0177530 A1 | 7/2008 | Cross et al. |
| 2008/0195393 A1 | 8/2008 | Cross et al. |
| 2008/0208584 A1 | 8/2008 | Ativanichayaphong et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Ben-David et al. |
| 2008/0208588 A1 | 8/2008 | Ativanichayaphong et al. |
| 2008/0208589 A1 | 8/2008 | Cross et al. |
| 2008/0208590 A1 | 8/2008 | Cross et al. |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross |
| 2008/0228495 A1 | 9/2008 | Cross et al. |
| 2008/0235021 A1 | 9/2008 | Cross et al. |
| 2008/0235022 A1 | 9/2008 | Bergl et al. |
| 2008/0235027 A1 | 9/2008 | Cross |
| 2008/0235029 A1 | 9/2008 | Cross et al. |
| 2008/0249782 A1 | 10/2008 | Ativanichayaphong et al. |
| 2008/0255850 A1 | 10/2008 | Cross et al. |
| 2008/0255851 A1 | 10/2008 | Ativanichayaphong et al. |
| 2009/0144428 A1 | 6/2009 | Bowater |

FOREIGN PATENT DOCUMENTS

| | | |
|---|---|---|
| CN | 1564123 | 1/2005 |
| EP | 0794670 | 9/1997 |
| EP | 1450350 | 8/2004 |
| JP | 2000155529 | 6/2000 |
| JP | 02003140672 | 5/2003 |
| WO | WO 99/48088 | 9/1999 |
| WO | WO 0051106 | 8/2000 |
| WO | WO 02/32140 | 4/2002 |
| WO | WO 2004/062945 | 7/2004 |
| WO | WO 2006108795 | 10/2006 |

OTHER PUBLICATIONS

U.S. Appl. No. 10/733,610, Cross, Jr., Dec. 11, 2003.
U.S. Appl. No. 10/741,499, Boughannam, Dec. 19, 2003.
U.S. Appl. No. 10/741,997, Boughannam, Dec. 19, 2003.
U.S. Appl. No. 10/849,642, Cross, Jr., May 19, 2004.
U.S. Appl. No. 10/870,517, Cross, Jr., Jun. 17, 2004.
U.S. Appl. No. 10/924,520, Cross, Jr., Aug. 24, 2004.
U.S. Appl. No. 10/945,112, Cross, Jr., Sep. 20, 2004.
U.S. Appl. No. 10/945,119, Cross, Jr., Sep. 20, 2004.
U.S. Appl. No. 10/992,979, Cross, Jr., Nov. 19, 2004.
U.S. Appl. No. 11/007,830, Cross, Jr., Dec. 8, 2004.
U.S. Appl. No. 11/022,464, Cross, Jr., Dec. 22, 2004.
U.S. Appl. No. 11/056,493, Agapi, Feb. 11, 2005.
U.S. Appl. No. 11/062,731, Jaramillo, Feb. 22, 2005.
U.S. Appl. No. 11/093,545, White, Mar. 30, 2005.
U.S. Appl. No. 11/105,865, Cross, Jr., Apr. 14, 2005.
U.S. Appl. No. 12/109,151, Agapi et al., Apr. 24, 2008.
U.S. Appl. No. 12/109,167, Agapi et al., Apr. 24, 2008.
U.S. Appl. No. 12/109,204, Agapi et al., Apr. 24, 2008.
U.S. Appl. No. 12/109,214, Agapi et al., Apr. 24, 2008.
U.S. Appl. No. 12/109,227, Agapi et al., Apr. 24, 2008.
U.S. Appl. No. 10/919,005, Eichenberger et al., Dec. 8, 2005.
Axelsson, et al., "XHTML+Voice Profile 1.2" Internet, [Online] Mar. 16, 2004, pp. 1-53, XP002484188 Retrieved from the Internet: URL: http://www.voicexml.org/specs/multimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No.; PCT/EP2008/051358.

PCT Search Report, Jun. 18, 2008; PCT Application No.; PCT/EP2008/051363.

Didier Guillevic, et al., Robust Semantic Confidence Scoring ICSLP 2002: 7$^{th}$ International Conference On Spoken Language Processing. Denver Colorado, Sep. 16-20, 2002 International Conference on Spoken Language Processing (ICSLP), Adelaide: Casual Productions, AI, Sep. 16, 2002, p. 853, XP007011561 ISBN:9788-1-876346-40-9.

* cited by examiner

ENABLING GLOBAL GRAMMARS FOR A PARTICULAR MULTIMODAL APPLICATION

RELATED APPLICATIONS

This application is a continuation, claiming the benefit under 35 U.S.C. §120, of U.S. patent application Ser. No. 11/679,279, entitled "ENABLING GLOBAL GRAMMARS FOR A PARTICULAR MULTIMODAL APPLICATION", filed on Feb. 27, 2007, which is herein incorporated by reference in its entirety.

BACKGROUND OF THE INVENTION

1. Field of the Invention

The field of the invention is data processing, or, more specifically, methods, apparatus, and products for enabling global grammars for a particular multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Currently grammars used in many multimodal web pages of multimodal applications must be enabled page by page. That is, they are not available across web pages in the same application. In X+V, for example, the container is an XHTML document which does not support grammars available across web pages. If the application author desires to make the same dialog or grammar active across multiple X+V pages, the author must include each grammar in each page. This makes applications more difficult to maintain and incurs a performance penalty as the grammars are compiled and enabled for every page.

SUMMARY OF THE INVENTION

Methods, apparatus, and computer program products are described for enabling global grammars for a particular multimodal application according to the present invention by loading a multimodal web page; determining whether the loaded multimodal web page is one of a plurality of multimodal web pages of the particular multimodal application. If the loaded multimodal web page is one of the plurality of multimodal web pages of the particular multimodal application, enabling global grammars typically includes loading any currently unloaded global grammars of the particular multimodal application identified in the multimodal web page and maintaining any previously loaded global grammars. If the loaded multimodal web page is not one of the plurality of multimodal web pages of the particular multimodal application, enabling global grammars typically includes unloading any currently loaded global grammars.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
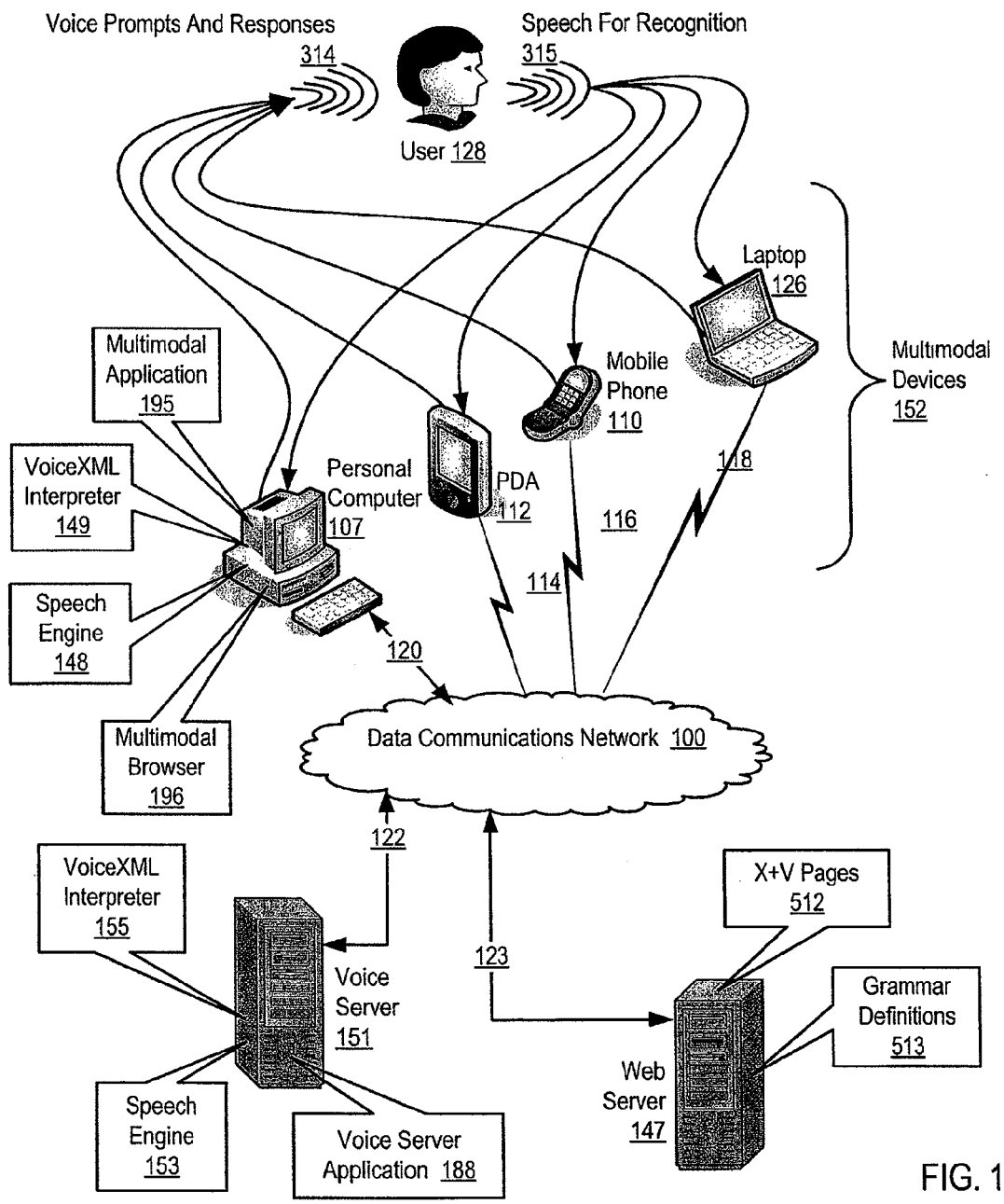
FIG. 1 sets forth a network diagram illustrating an exemplary system for enabling global grammars for a particular multimodal application in a multimodal application according to embodiments of the present invention FIG. 2 sets forth a block diagram of automated computing machinery comprising an example of a computer useful as a voice server in enabling global grammars for a particular multimodal application according to embodiments of the present invention.

Exemplary methods, apparatus, and products enabling global grammars for a particular multimodal application in a multimodal application are described with reference to the accompanying drawings, beginning with FIG. 1. FIG. 1 sets forth a network diagram illustrating an exemplary system for enabling global grammars for a particular multimodal application according to embodiments of the present invention. Enabling global grammars for a particular multimodal application in this example is implemented with a multimodal browser (196) and a multimodal application (195) operating on a multimodal device (152). The system of FIG. 1 includes at least one speech recognition grammar (104) that specifies words and phrases to be recognized by an automatic speech recognition ('ASR') engine (150) of a speech engine (148, 153). The multimodal device (152) supports multiple modes of user interaction with the multimodal application including a voice mode and one or more non-voice modes of user interaction with the multimodal application. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal application is operatively coupled (195) to an ASR engine (150) in a speech engine (148). The operative coupling may be implemented with an application programming interface CAM, a voice service module, or a VOIP connection as explained more detail below.

The system of FIG. 1 operates generally to carry out enabling global grammars for a particular multimodal application according to the present invention by loading a multimodal web page; determining whether the loaded multimodal web page is one of a plurality of multimodal web pages of the particular multimodal application. If the loaded multimodal web page is one of the plurality of multimodal web pages of the particular multimodal application, enabling global grammars typically includes loading any currently unloaded global grammars of the particular multimodal application identified in the multimodal web page and maintaining any previously loaded global grammars. If the loaded multimodal web page is not one of the plurality of multimodal web pages of the particular multimodal application, enabling global grammars typically includes unloading any currently loaded global grammars.

Global grammars are grammars that are enabled across multimodal web pages in a particular multimodal application. That is, global grammars are enabled once and then maintained across multimodal web pages of the same multimodal application. Such global grammars, once enabled, are typically only disabled upon loading a web page that is not included in the multimodal application associated with the global grammar. Global grammars provide increased flexibility to multimodal application programmers and increased efficiency to such multimodal applications because they are not required to be loaded with the loading of each and every web page in the multimodal application they support.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202

050 Advanced DSR Front-end Codec, the ETSI ES 202 211 Extended DSR Front-end Codec, and the ETSI ES 202 212 Extended Advanced DSR Front-end Codec. In standards such as RFC3557 entitled > RTP Payload Format for European Telecommunications Standards Institute (ETSI) European Standard ES 201 108 Distributed Speech Recognition Encoding and the Internet Draft entitled > RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Multimodal applications according to embodiments of the present invention may implement any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

A Form Interpretation Algorithm ('FIA') drives the interaction between the user and a multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention. Each of the example multimodal devices (152) in the system of FIG. 1 may be configured to carry out enabling global grammars for a particular multimodal application according to the present invention. The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for enabling global grammars for a particular multimodal application according to the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network useful for enabling global grammars for a particular multimodal application according to embodiments of the present invention is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for enabling global grammars for a particular multimodal application according to the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Enabling global grammars for a particular multimodal application according to the present invention according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) for enabling global grammars for a particular multimodal application according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured for use in enabling global grammars for a particular multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support embodiments of the present invention may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use as, for example, global grammars for a particular multimodal application according to the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush;
    <when> = today | this afternoon | tomorrow | next week;
]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a multimodal application.

As mentioned above, a Form Interpretation Algorithm ('FIA') drives the interaction between the user and a multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Figure 2:
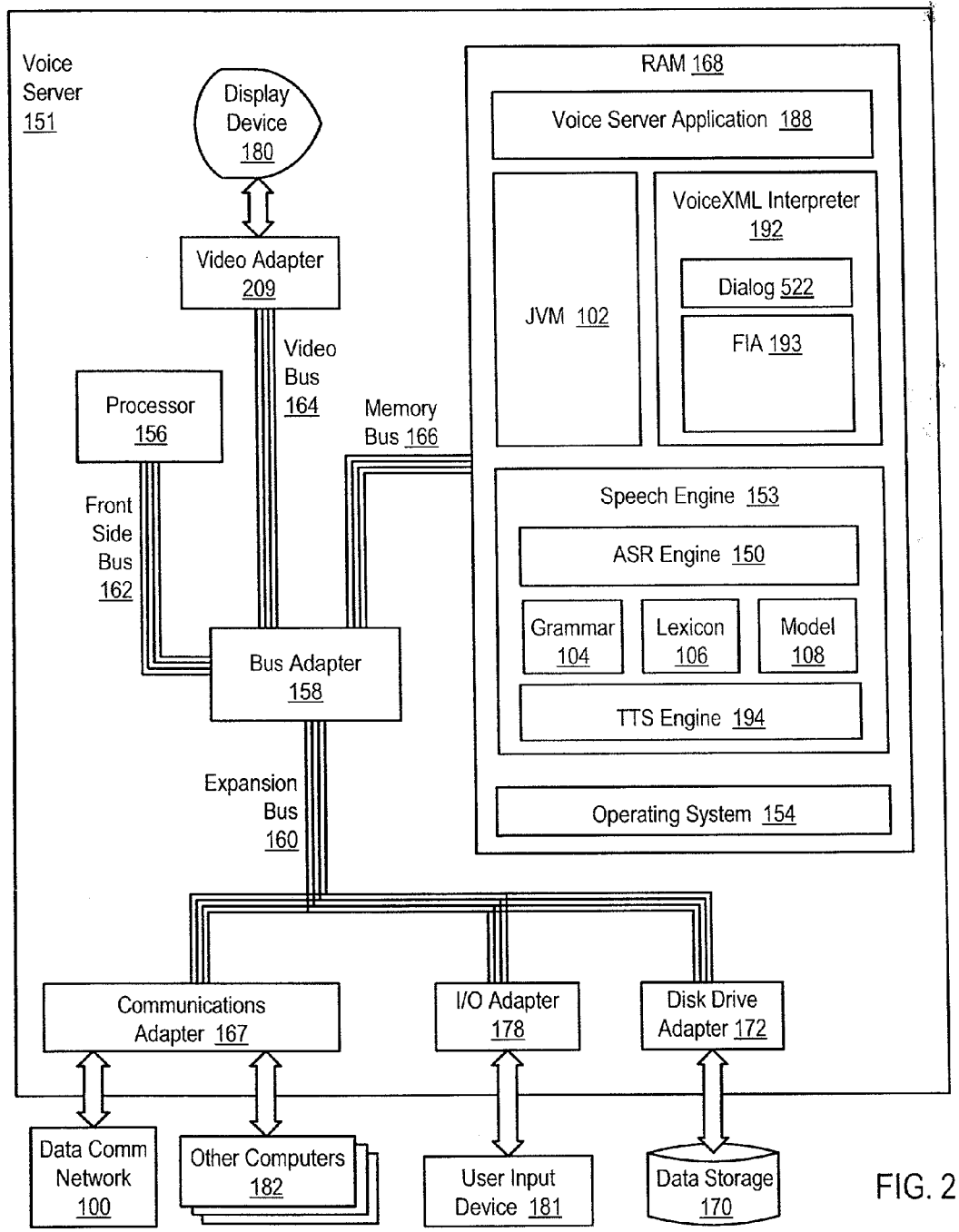

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 3:
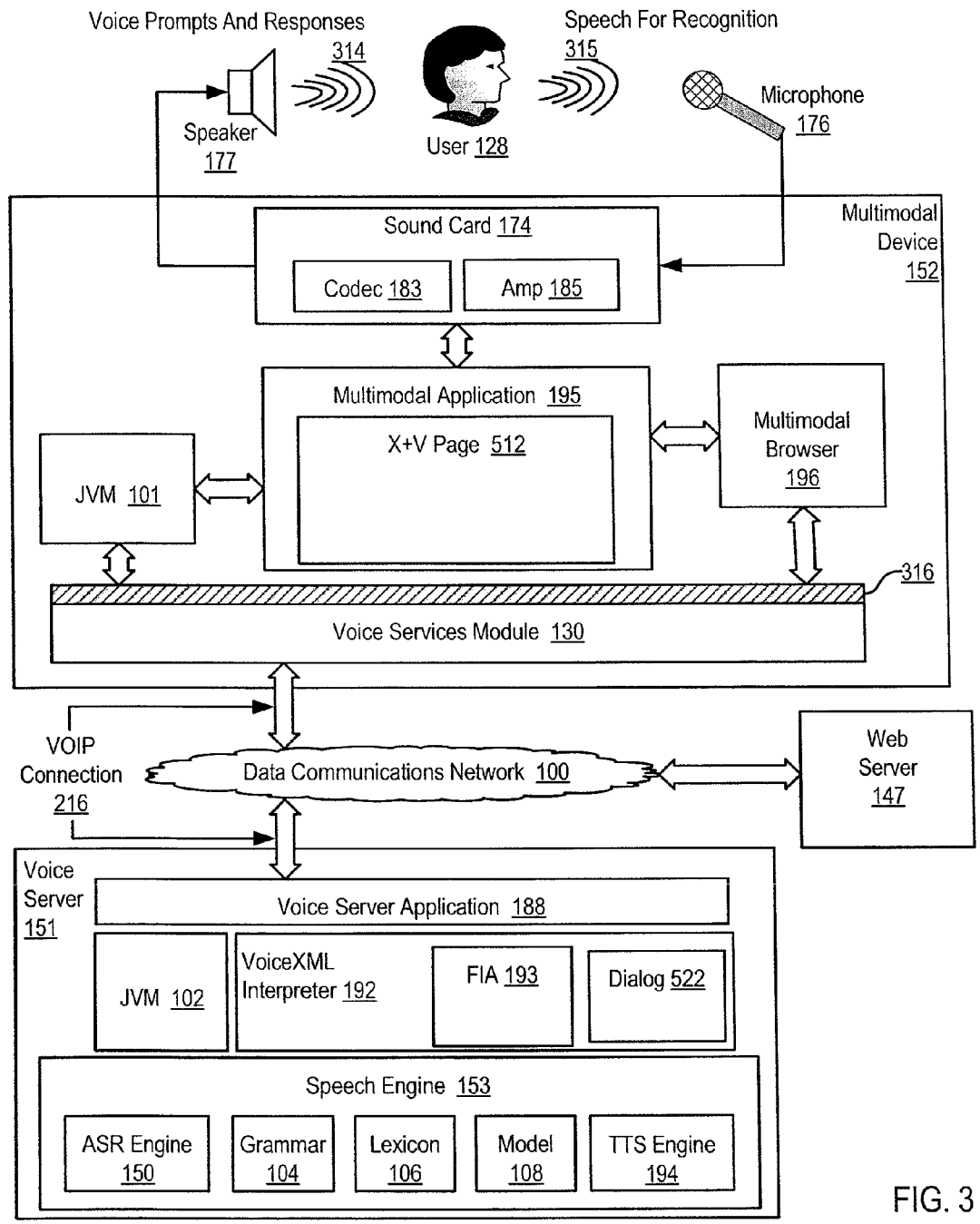
FIG. 3 sets forth a functional block diagram of exemplary apparatus for enabling global grammars for a particular multimodal application in a thin client architecture according to embodiments of the present invention.

For further explanation, FIG. 3 sets forth a functional block diagram of exemplary apparatus for enabling global grammars for a particular multimodal application according to the present invention in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and either JVM (102), VoiceXML interpreter (192), or SALT interpreter (103), depending on whether the multimodal application is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 4). So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

The multimodal browser (196) of FIG. 3 operates generally to carry out enabling global grammars for a particular multimodal application according to the present invention by loading a multimodal web page; determining whether the loaded multimodal web page is one of a plurality of multimodal web pages of the particular multimodal application. If the loaded multimodal web page is one of the plurality of multimodal web pages of the particular multimodal application, the browser operates to carry out enabling global grammars by loading any currently unloaded global grammars of the particular multimodal application identified in the multimodal web page and maintaining any previously loaded global grammars. If the loaded multimodal web page is not one of the plurality of multimodal web pages of the particular multimodal application, the browser operates to carry out enabling global grammars by unloading any currently loaded global grammars.

Figure 4:
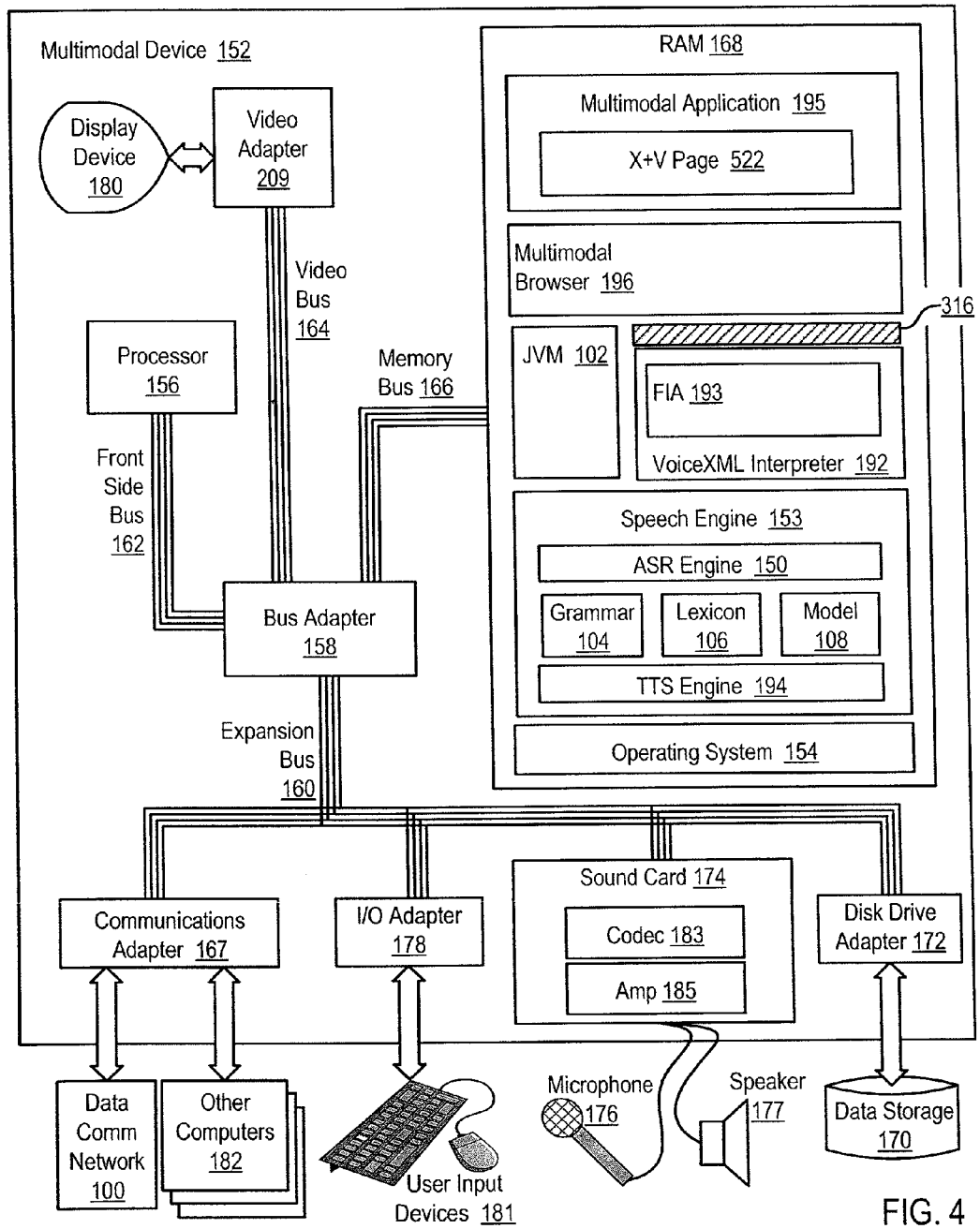
FIG. 4 sets forth a block diagram of automated computing machinery comprising an example of a computer useful as a multimodal device in enabling global grammars for a particular multimodal application according to embodiments of the present invention.

Enabling global grammars for a particular multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) for enabling global grammars for a particular multimodal application according to embodiments of the present invention. In a multimodal device implementing a thick client architecture as illustrated in FIG. 4, the multimodal device (152) has no connection to a remote voice server containing a VoiceXML interpreter and a speech engine. All the components needed for speech synthesis and voice recognition according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 4, the speech engine in the multimodal device of FIG. 2 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and issues calls through the VoiceXML API (316) for speech recognition and speech synthesis services. In further exemplary embodiments, the multimodal application (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

The multimodal application (195) is operatively coupled to the ASR engine (150). In this example, the operative coupling between the multimodal application and the ASR engine (150) is implemented either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment for the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for speech recognition—is implemented on the multimodal device itself.

The multimodal browser (196) of FIG. 4 operates generally to carry out enabling global grammars for a particular multimodal application according to the present invention by loading a multimodal web page; determining whether the loaded multimodal web page is one of a plurality of multimodal web pages of the particular multimodal application. If the loaded multimodal web page is one of the plurality of multimodal web pages of the particular multimodal application, the browser operates to carry out enabling global grammars by loading any currently unloaded global grammars of the particular multimodal application identified in the multimodal web page and maintaining any previously loaded global grammars. If the loaded multimodal web page is not one of the plurality of multimodal web pages of the particular multimodal application, the browser operates to carry out enabling global grammars by unloading any currently loaded global grammars.

Figure 5:
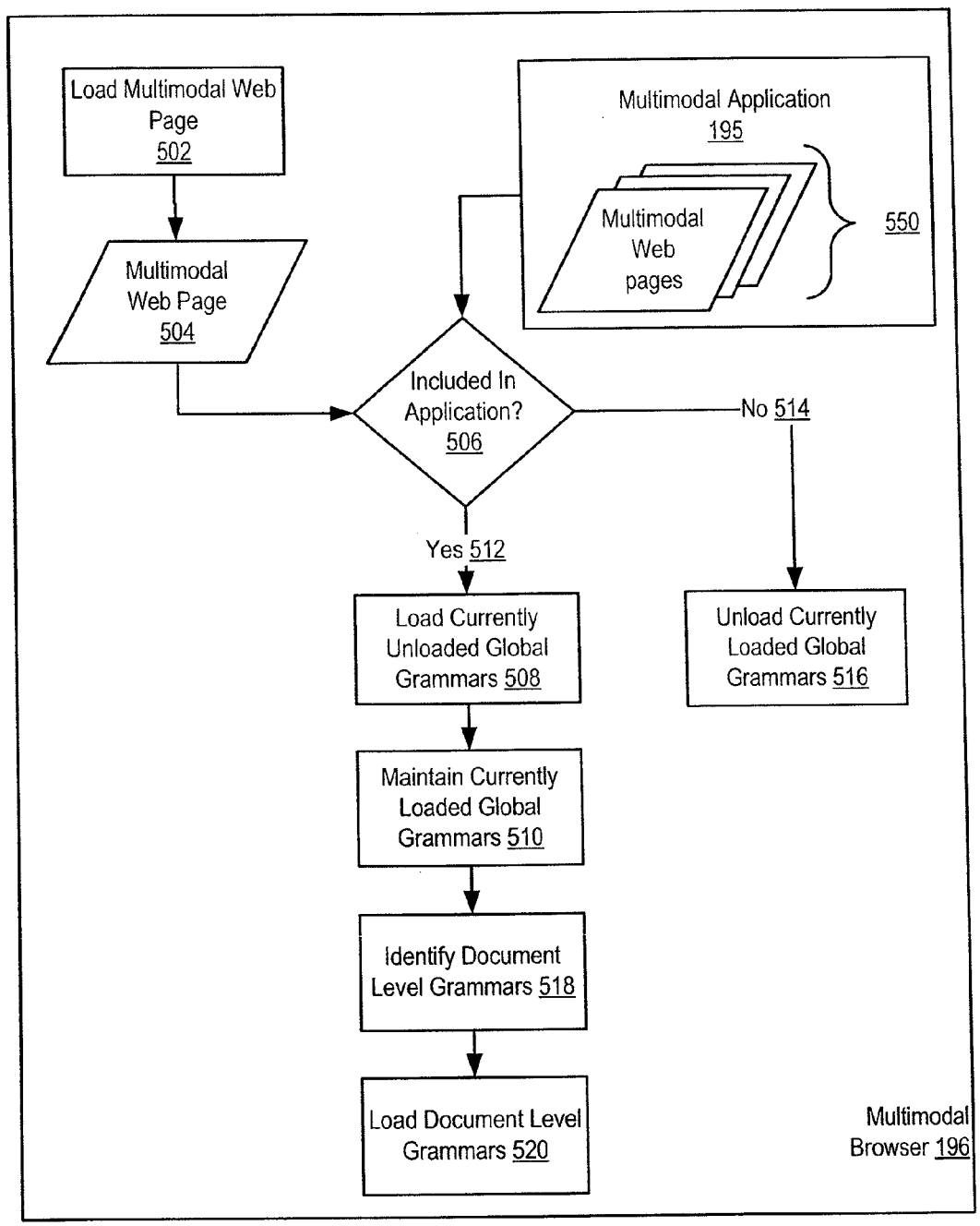
FIG. 5 sets forth a flow chart illustrating an exemplary method for enabling global grammars for a particular multimodal application according to embodiments of the present invention.

For further explanation, FIG. 5 sets forth a flow chart illustrating an exemplary method for enabling global grammars for a particular multimodal application. As mentioned above, global grammars are grammars that are enabled across multimodal web pages in a particular multimodal application. That is, global grammars are enabled once and then maintained across multimodal web pages of the same multimodal application. Such global grammars, once enabled, are typically only disabled upon loading a web page that is not included in the multimodal application associated with the global grammar. Global grammars are distinguished from document level grammars, such as grammars with dialog scope or document scope, which are only enabled when the multimodal web page they support are loaded. Global grammars therefore provide increased flexibility to multimodal application programmers and increased efficiency to such multimodal applications because they are not required to be loaded with the loading of each and every web page in the multimodal application they support.

The method of FIG. 5 is implemented with a multimodal browser and a multimodal application operating on a multimodal device supporting multiple modes of user interaction with the multimodal application including a voice mode and one or more non-voice modes. The voice mode may include audio output through a speaker and audio input through a microphone. Non-voice modes may include user input devices, such as a keyboard and a mouse. In the example of FIG. 5, the multimodal browser (196) supports enabling global grammars for a particular multimodal application according to the present invention.

The method of FIG. 5 includes loading (502) a multimodal web page (504). As mentioned above, multimodal applications are often formed by sets of markup documents served up by web servers for display on multimodal browsers. A multimodal web page is a markup document capable of being displayed in a multimodal browser capable of receiving multimodal input and interacting with users with multimodal output, where modes of the multimodal input and output include at least a speech mode. Multimodal web pages useful in implementing the method of FIG. 5 include web pages written in XHTML+Voice ('X+V'), Speech Application Tags ('SALT') and other markup languages as will occur to those of skill in the art.

The method of FIG. 5 also includes determining (506) whether the loaded multimodal web page (504) is one of a plurality of multimodal web pages (550) of the particular multimodal application (195). Determining (506) whether the loaded multimodal web page (504) is one of a plurality of multimodal web pages (550) of the particular multimodal application (195) may be carried out by comparing a base URI for the particular multimodal application with a designated URI in the multimodal web page as discussed below with reference to FIG. 6.

If the loaded multimodal web page (504) is (512) one of the plurality of multimodal web pages (550) of the particular multimodal application (195) the method of FIG. 5 includes loading (508) any currently unloaded global grammars of the particular multimodal application identified in the multimodal web page and maintaining (510) any previously loaded global grammars. Loading (508) any currently unloaded global grammars of the particular multimodal application identified in the multimodal web page may be carried out by identifying in dependence upon markup in the multimodal web page a global grammar; determining that the identified global grammar is not currently loaded; and loading (714) the identified global grammar (704) as discussed below with reference to FIG. 7.

Maintaining (510) any previously loaded global grammars is typically carried out by failing to unload the loaded global grammar. Maintaining (510) any previously loaded global grammars is typically carried out by continuing to enable the loaded global grammar.

If the loaded multimodal web page (504) is not (514) one of the plurality of multimodal web pages (550) of the particular multimodal application (195), the method of FIG. 5 also includes unloading (516) any currently loaded global grammars. Unloading (516) any currently loaded global grammars disables the global grammar for the particular multimodal application. The global grammar is unloaded in the method of FIG. 5 if the global grammar has been determined to be associated with an application that does not include the currently loaded multimodal web page.

The method of FIG. 5 also includes identifying (518) in dependence upon markup in the loaded multimodal web page (504) any document level grammars and loading (520) the document level grammars identified by the markup. Identifying (518) in dependence upon markup in the loaded multimodal web page (504) any document level grammars may be carried out by identifying a scope attribute for a VoiceXML form in an X+V document. Such a scope attribute may be set to dialog scope or document scope, for example to identify the grammar associated with that VoiceXML form as a document level grammar. Such document level grammars are enabled only for their identified multimodal web page.

Figure 6:
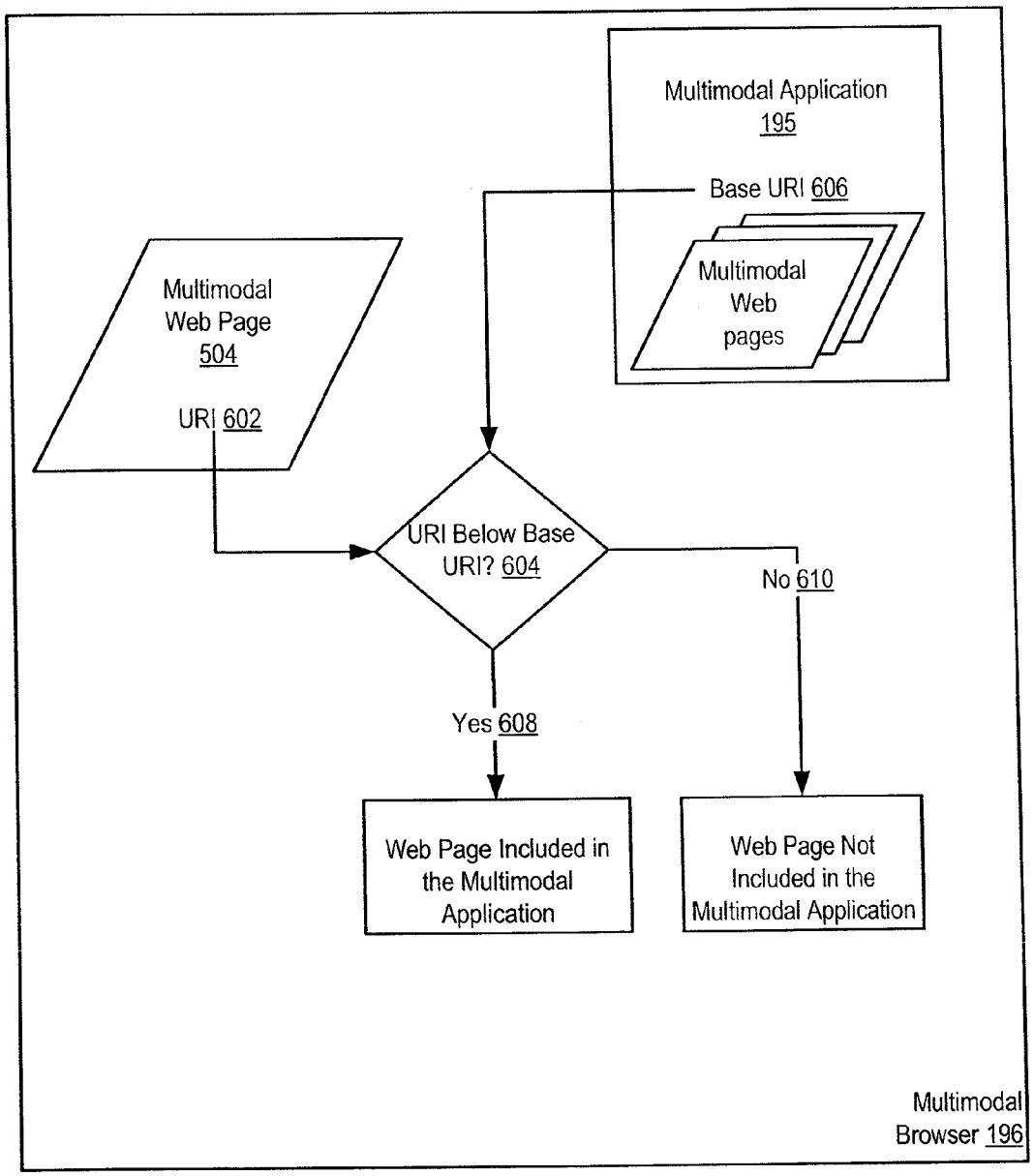
FIG. 6 sets forth a flow chart of an exemplary method for determining whether the loaded multimodal web page is one of a plurality of multimodal web pages of the particular multimodal application.

As mentioned above, determining whether the loaded multimodal web page is one of a plurality of multimodal web pages of the particular multimodal application may be carried out by comparing a base URI for the particular multimodal application with a designated URI in the multimodal web page. For further explanation, therefore, FIG. 6 sets forth a flow chart of an exemplary method for determining whether the loaded multimodal web page is one of a plurality of multimodal web pages of the particular multimodal application in accordance with the present invention. In the method of FIG. 6, determining whether the loaded multimodal web page is one of a plurality of multimodal web pages of the particular multimodal application may be carried out by comparing a base URI (602) for the particular multimodal application (195) with a designated URI (602) in the multimodal web page (504). Comparing a base URI (602) for the particular multimodal application (195) with a designated URI (602) in the multimodal web page (504) is carried out by identifying a designated URI for the multimodal web page either explicitly or by inferring the designated URI and determining whether the designated URI is beneath the base URI for the particular multimodal application.

A base URI (602) for the multimodal application is typically implemented as a Universal Resource Identifier ('URI') which does not reference a specific document. The base URI instead references a name space location such as referencing a server domain and a directory structure where an X+V application, containing one or more X+V documents resides. All X+V pages in directories at or below the base URI are designated as belonging to the same X+V application. The base URI therefore provides an application scope to a domain and directory structure which contain a set of multimodal web pages.

A designated URI (602) in the multimodal web page (504) is a URI designated in the multimodal web page for determining whether the multimodal web page is one of the plurality of multimodal web pages of the multimodal application. In some cases the designated URI may be explicitly identified in the multimodal web page. Examples of such an explicitly identified designated URI may include a URI implemented as an HTML base element, a URI implemented as a base attribute associated with the <form> or <link> element in X+V, or in other ways as will occur to those of skill in the art.

In other cases the designated URI may be inferred rather than explicitly included in the web page. Such a designated URI may be inferred from the URI pointing to the web page itself. That is, if the multimodal web page is retrieved from a URI beneath the base URI of the multimodal application, then the web page is determined to be one of the plurality of web pages of the multimodal application and global grammars for that particular multimodal application may be enabled for the page.

Consider for example a multimodal web page having an explicit designation of a designated URI of 'http://www.example.com/apps/myApp/chapter.mxml' and a base URI for a multimodal application of 'http://www.example.com.' Comparing the designated URI and the base URI of multimodal application reveals that the designated URI is beneath the base URI of the multimodal application and the multimodal web page is therefore determined to be one of the multimodal web pages of the particular multimodal application and therefore global grammars associated with that multimodal application are either loaded or maintained for that page.

Consider another example of a multimodal web page having an explicit designation of a designated URI of 'http://www.example.com/apps/myApp/chapter.mxml' and a base URI for a multimodal application of 'http://www.example.com/anotherExample.' Comparing the designated URI and the base URI of multimodal application reveals that the designated URI is not beneath the base URI of the multimodal application and the multimodal web page is therefore determined to be a multimodal web page that is not included in the particular multimodal application and therefore global grammars associated with that particular multimodal application are unloaded and not enabled for that page.

As mentioned above, enabling global grammars for a particular multimodal application according to the present invention includes loading any global grammars of the particular multimodal application identified in the multimodal web page if the global grammars are not currently loaded. For further explanation, therefore, FIG. 7 sets forth a flow chart illustrating an exemplary method for loading any global grammars of the identified in the multimodal web page if the global grammars are not currently loaded. The method of FIG. 7 includes identifying (706) in dependence upon markup (702) in the multimodal web page (504) a global grammar (704). Identifying (706) in dependence upon markup (702) in the multimodal web page (504) a global grammar (704) further comprises identifying a scope attribute for a VoiceXML form in an X+V document. Such a scope attribute may be set to application designating the grammar associated with that VoiceXML form as a global grammar.

Figure 7:
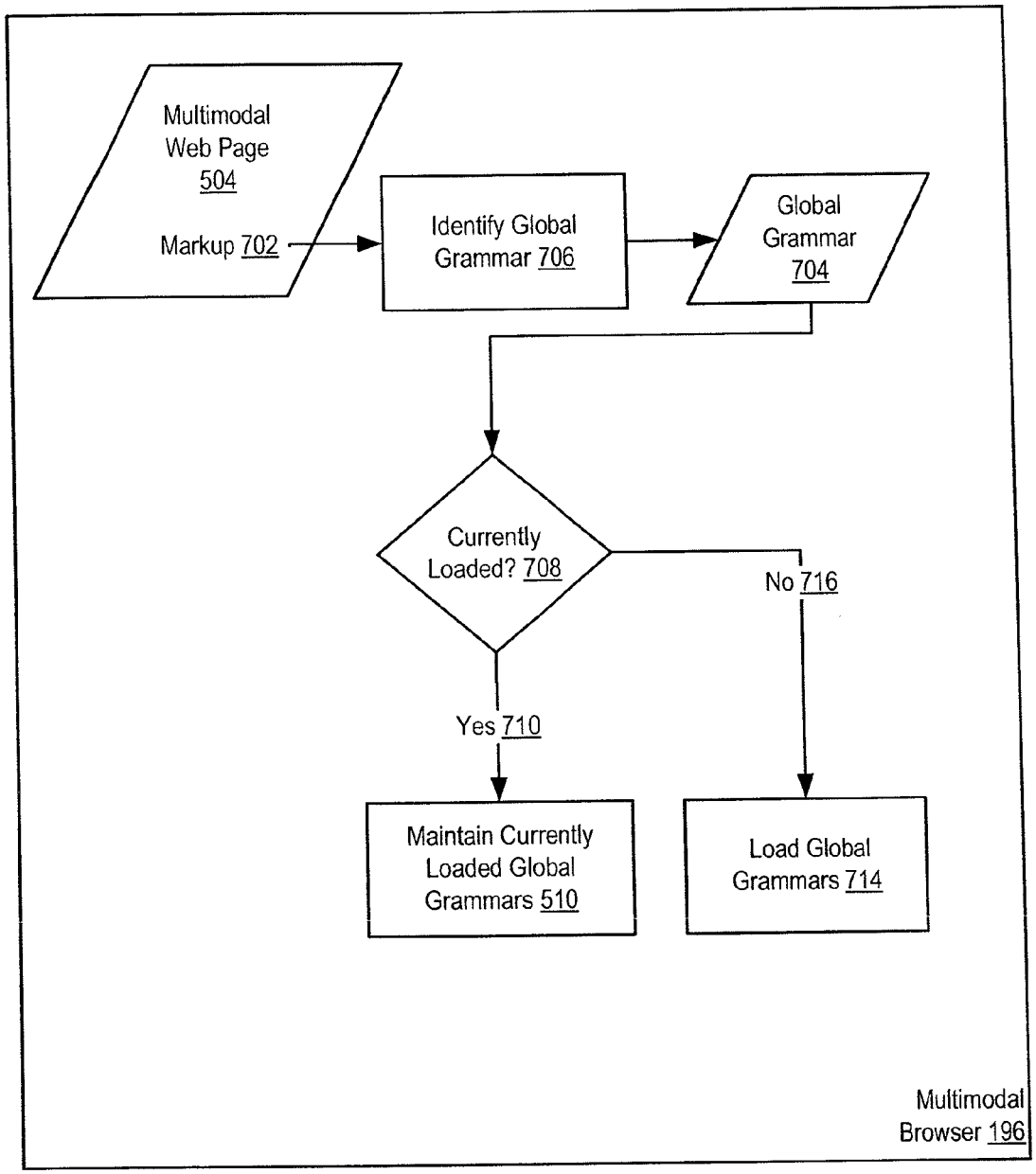
FIG. 7 sets forth a flow chart illustrating an exemplary method for loading any global grammars of the particular multimodal application identified in the multimodal web page if the global grammars are not currently loaded.

The method of FIG. 7 also includes determining (708) that the identified global grammar is not (716) currently loaded and loading (714) the identified global grammar (704). If the identified global grammar is (710) currently loaded the method of FIG. 7 includes maintaining the currently loaded global grammar.

Exemplary embodiments of the present invention are described largely in the context of a fully functional computer system for enabling global grammars for a particular multimodal application. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for enabling global grammars for a particular multimodal application, the method implemented on a multimodal device supporting at least a voice mode of user interaction with the multimodal application, the method comprising:
   loading a multimodal web page;
   determining whether the loaded multimodal web page is one of a plurality of multimodal web pages of the particular multimodal application; and
   managing enabling of one or more global grammars based at least in part on the determination of whether the loaded multimodal web page is one of the plurality of multimodal web pages of the particular multimodal application.

2. The method of claim 1, wherein the managing comprises:
   if it is determined that the loaded multimodal web page is one of the plurality of multimodal web pages of the particular multimodal application, loading at least one global grammar in the loaded multimodal web page.

3. The method of claim 1, wherein the managing comprises:
   if it is determined that the loaded multimodal web page is one of the plurality of multimodal web pages of the particular multimodal application, maintaining at least one previously loaded global grammar.

4. The method of claim 1, wherein the managing comprises:
   if it is determined that the loaded multimodal web page is not one of the plurality of multimodal web pages of the particular multimodal application, unloading at least one global grammar.

5. The method of claim 1, wherein determining whether the loaded multimodal web page is one of the plurality of multimodal web pages of the particular multimodal application comprises comparing a base Universal Resource Identifier (URI) for the particular multimodal application with a designated URI in the loaded multimodal web page.

6. The method of claim 2, further comprising identifying the at least one global grammar based at least in part on markup in the loaded multimodal web page.

7. The method of claim 6, wherein identifying the at least one global grammar comprises identifying a scope attribute for a VoiceXML form in an X+V document.

8. Apparatus for enabling global grammars for a particular multimodal application, the apparatus supporting at least a voice mode of user interaction, the apparatus comprising at least one computer processor and a computer memory operatively coupled to the at least one computer processor, the computer memory having disposed within it computer program instructions that, when executed by the at least one computer processor, perform a method comprising:
   loading a multimodal web page;
   determining whether the loaded multimodal web page is one of a plurality of multimodal web pages of the particular multimodal application; and managing enabling of one or more global grammars based at least in part on the determination of whether the loaded multimodal web page is one of the plurality of multimodal web pages of the particular multimodal application.

9. The apparatus of claim 8, wherein the managing comprises:
if it is determined that the loaded multimodal web page is one of the plurality of multimodal web pages of the particular multimodal application, loading at least one global grammar in the loaded multimodal web page.

10. The apparatus of claim 8, wherein the managing comprises:
if it is determined that the loaded multimodal web page is one of the plurality of multimodal web pages of the particular multimodal application, maintaining at least one previously loaded global grammar.

11. The apparatus of claim 8, wherein the managing comprises:
if it is determined that the loaded multimodal web page is not one of the plurality of multimodal web pages of the particular multimodal application, unloading at least one global grammar.

12. The apparatus of claim 8, wherein determining whether the loaded multimodal web page is one of the plurality of multimodal web pages of the particular multimodal application comprises comparing a base Universal Resource Identifier (URI) for the particular multimodal application with a designated URI in the loaded multimodal web page.

13. The apparatus of claim 9, wherein the method further comprises identifying the at least one global grammar based at least in part on markup in the loaded multimodal web page.

14. At least one recordable computer-readable medium encoded with computer-executable instructions that, when executed, perform a method for enabling global grammars for a particular multimodal application, the method implemented on a multimodal device supporting at least a voice mode of user interaction with the multimodal application, the method comprising:
loading a multimodal web page;
determining whether the loaded multimodal web page is one of a plurality of multimodal web pages of the particular multimodal application; and
managing enabling of one or more global grammars based at least in part on the determination of whether the loaded multimodal web page is one of the plurality of multimodal web pages of the particular multimodal application.

15. The at least one recordable computer-readable medium of claim 14, wherein the managing comprises:
if it is determined that the loaded multimodal web page is one of the plurality of multimodal web pages of the particular multimodal application, loading at least one global grammar in the loaded multimodal web page.

16. The at least one recordable computer-readable medium of claim 14, wherein the managing comprises:
if it is determined that the loaded multimodal web page is one of the plurality of multimodal web pages of the particular multimodal application, maintaining at least one previously loaded global grammar.

17. The at least one recordable computer-readable medium of claim 14, wherein the managing comprises:
if it is determined that the loaded multimodal web page is not one of the plurality of multimodal web pages of the particular multimodal application, unloading at least one global grammar.

18. The at least one recordable computer-readable medium of claim 14, wherein determining whether the loaded multimodal web page is one of the plurality of multimodal web pages of the particular multimodal application comprises comparing a base Universal Resource Identifier (URI) for the particular multimodal application with a designated URI in the loaded multimodal web page.

19. The at least one recordable computer-readable medium of claim 15, wherein the method further comprises identifying the at least one global grammar based at least in part on markup in the loaded multimodal web page.

20. The at least one recordable computer-readable medium of claim 19, wherein identifying the at least one global grammar comprises identifying a scope attribute for a VoiceXML form in an X+V document.

* * * * *